J. E. R. FOX.
AUTOMOBILE LOCK.
APPLICATION FILED DEC. 2, 1915.
1,193,679.
Patented Aug. 8, 1916.
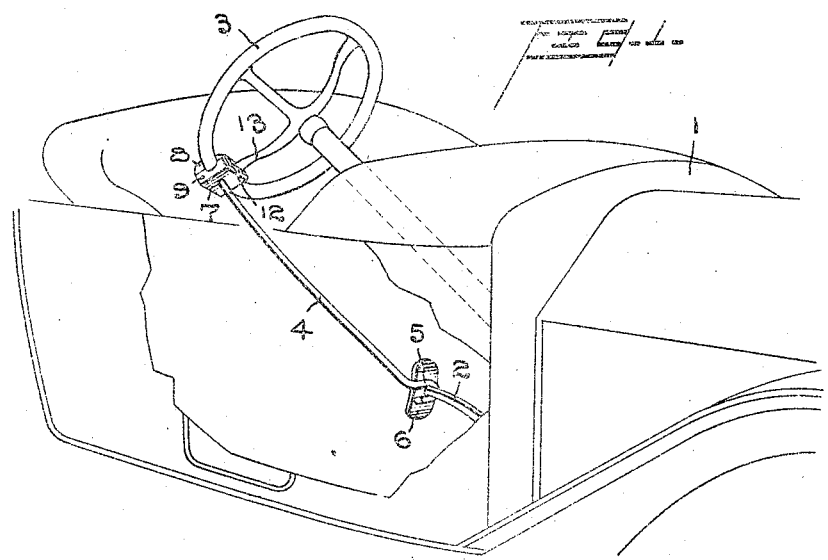
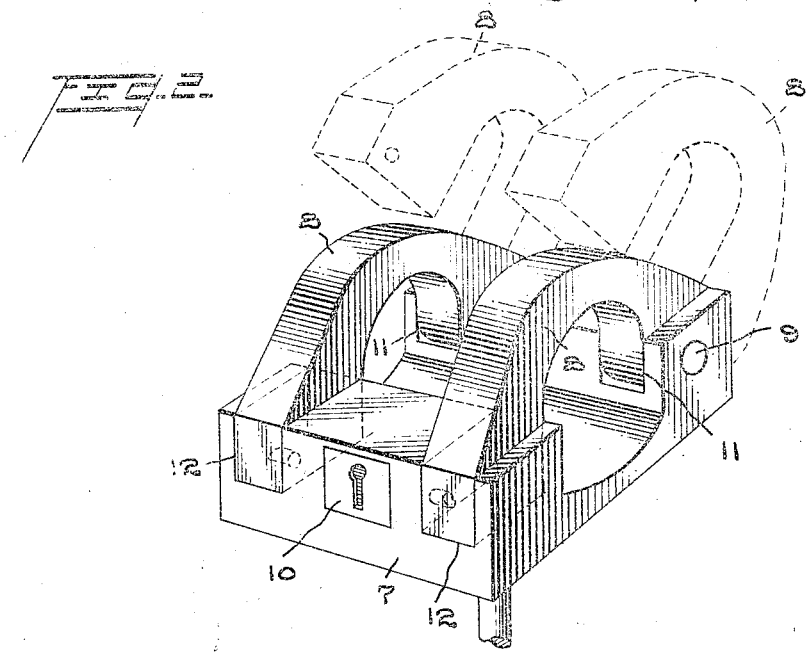
Inventor
John E. R. Fox,
Witnesses
By Joshua R. H. Potts
His Attorney

UNITED STATES PATENT OFFICE.

JOHN E. R. FOX, OF PHILADELPHIA, PENNSYLVANIA.

AUTOMOBILE-LOCK.

1,193,679.  Specification of Letters Patent.  Patented Aug. 8, 1916.

Application filed December 2, 1915. Serial No. 64,627.

*To all whom it may concern:*

Be it known that I, JOHN E. R. FOX, a citizen of the United States, residing at Philadelphia, in the county of Philadelphia and State of Pennsylvania, have invented certain new and useful Improvements in Automobile-Locks, of which the following is a specification.

My invention relates to improvements in automobile locks, the object of the invention being to provide a locking device which holds the clutch foot lever against movement, and also secures the steering wheel against turning movement.

Heretofore, various forms of lock have been devised which prevent the operation of the engine or the clutch lever, but such mechanisms do not prevent the turning of the steering wheel so that the machine may be towed without being unlocked, and it is the purpose of my improved device to provide a lock which not only prevents operation of the clutch, but also prevents movement of the steering wheel, which would make it practically impossible to tow the machine.

With these and other objects in view, the invention consists in certain novel features of construction and combinations and arrangements of parts as will be more fully hereinafter described and pointed out in the claims.

In the accompanying drawings: Figure 1 is a perspective view illustrating my improved device in operative position, and Fig. 2 is a perspective view of the wheel engaging portion on an enlarged scale illustrating in full lines the twin shackles in locked position, and in dotted lines in open position.

1 represents an automobile having the ordinary foot lever 2 for operating the clutch, and having the ordinary steering wheel 3.

My improved locking device comprises a rod having one end bent forming a laterally projecting hook 5, to engage around the foot lever 2 back of the foot rest 6. The other end of rod 4 is secured to a block 7 and this block is provided with twin shackles 8, 8, which are pivotally connected to the block 7 by a pin 9, and at their free ends are adapted to be secured by a lock 10. The shackles 8, at their pivoted ends, are located in recesses 11 in the block, and their free ends are adapted to move into recesses 12 in the opposite ends of the block. By thus constructing the block with its recesses 11 and 12 to accommodate both ends of the shackles, said shackles are held against any possibility of lateral movement when they are locked in closed position.

In operation, the shackles engage the steering wheel at opposite sides of a spoke 13, so that the block cannot be moved around the steering wheel, and the steering wheel cannot be turned because the rod 4 is of a length just sufficient to extend from the foot lever to the steering wheel.

It will be noted, particularly by reference to Fig. 1, that the laterally projecting hook 5 cannot be disengaged from the foot lever 2 until the shackles 8 are released from the hand wheel, hence when the shackles are securely locked, the entire device is held against removal by any except the authorized person with the necessary key.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A device of the character described, comprising a member having a hook at one end adapted to engage a lever, and having twin shackles at its other end adapted to engage a steering wheel at opposite sides of a spoke thereof, substantially as described.

2. A device of the character described, comprising a rod having a hook at one end adapted to engage a lever, a block fixed to the other end of the rod, and twin shackles carried by the block and adapted to engage a steering wheel at opposite sides of a spoke thereof, substantially as described.

3. A device of the character described, comprising a rod having a laterally projecting hook at one end, and a block at its other end, said block having a pair of recesses in its opposite ends, a pair of shackles pivotally secured in the recesses at one end of the block and at their free ends movable into the recesses at the other end of the block, and a lock carried by the block and adapted to lock the free ends of the shackles, substantially as described.

In testimony whereof I have signed my name to this specification in the presence of two subscribing witnesses.

JOHN E. R. FOX.

Witnesses:
   MARIE JACKSON,
   S. W. FOSTER.